United States Patent [19]

Washkewicz et al.

[11] 3,966,238

[45] June 29, 1976

[54] HOSE CONSTRUCTION AND HOSE COUPLING JOINT

[75] Inventors: Donald E. Washkewicz, Euclid; Wayne S. Busdiecker, Stow, both of Ohio

[73] Assignee: Parker-Hannifin Corporation, Cleveland, Ohio

[22] Filed: July 16, 1975

[21] Appl. No.: 596,254

Related U.S. Application Data

[63] Continuation of Ser. No. 465,183, April 29, 1975, abandoned.

[52] U.S. Cl. ............................... 285/239; 138/125; 285/259
[51] Int. Cl.² .......................................... F16L 33/00
[58] Field of Search .......... 285/239, 247, 248, 249, 285/259; 138/125, 126, 137, 144

[56] References Cited
UNITED STATES PATENTS

| | | | |
|---|---|---|---|
| 1,996,855 | 4/1935 | Cheswright | 285/239 |
| 2,805,088 | 9/1957 | Cline et al. | 285/239 |
| 3,210,100 | 10/1965 | Lowles et al. | 285/239 |
| 3,266,527 | 8/1966 | Ross | 138/125 |
| 3,332,447 | 7/1967 | Holmgren | 138/125 |
| 3,613,736 | 10/1971 | Kuwabara | 285/239 |
| 3,711,130 | 1/1973 | Betzler | 285/239 |
| 3,759,445 | 9/1973 | King | 285/239 X |

FOREIGN PATENTS OR APPLICATIONS

| | | | |
|---|---|---|---|
| 294,531 | 9/1969 | Australia | 285/239 |
| 737,216 | 9/1955 | United Kingdom | 138/125 |

*Primary Examiner*—Thomas F. Callaghan
*Attorney, Agent, or Firm*—John N. Wolfram

[57] ABSTRACT

A hose construction comprising a core tube of either synthetic rubber or plasticized polyvinyl chloride plastic, a braided non-metallic fibrous reinforcement over the core tube, and an outer cover of either synthetic rubber or plasticized polyvinyl chloride plastic when the core tube is of polyvinyl chloride plastic, or the cover is plasticized polyvinyl chloride plastic when the core tube is synthetic rubber. The hose is particularly suited for use with barbed hose couplings insertable into the hose wherein the hose is held on to the coupling by contractive force of the hose on the barbs without the use of external clamps or gripping members on the hose.

4 Claims, 6 Drawing Figures

HOSE CONSTRUCTION AND HOSE COUPLING JOINT

BACKGROUND OF THE INVENTION

This application is a continuation of application Ser. No. 465,183, filed Apr. 29, 1975, and now abandoned.

For many installations of flexible hose where fluid pressures are in the range of 60 PSI to 150 PSI (such as shop air lines, industrial and automotive water, gasoline, oil, antifreeze and other fluid lines) it is necessary to use reinforcement materials in the hose to give the hose adequate burst strength. It is also highly desirable from the standpoint of low cost and ease of assembly to utilize "push-on" hose couplings of the type disclosed in U.S. Pat. No. 3,210,100 of Lowles et al issued Oct. 5, 1965, for connecting the hose to various devices to or from which fluid is to be conveyed. This type of hose coupling comprises a barbed nipple insertable into the hose whereby the hose is expanded in diameter over the barbs and in which the contracting force of the expanded hose is sufficient for maintaining the hose on the coupling without the use of external clamps or sockets.

In the past, hoses having core tubes and covers of synthetic rubber (such as Buna N or neoprene) with a Rayon braided reinforcement therebetween have been used with such push-on couplings. However, these materials are relatively expensive and it has long been desirable to use a cheaper material, such as polyvinyl chloride (PVC) for either or both the core tube and cover, depending on the type of service for which the hose is intended.

Hoses for push-on couplings must have certain characteristics for proper functioning with such couplings. Thus, the hose must be able to be pushed onto the coupling over the barbs without too much force because this operation is frequently performed manually.

The assembled joint must be able to withstand many cycles of pressure pulses without leakage and without blowing the hose off from the coupling, and the joint must be able to withstand temperature extremes without leakage or blowoff which in some cases may be as low as −40°F and as high as 200°F.

It has been found that for ease of assembly of the coupling to the hose there must be a good bond between the braid and both the cover and core tube so that neither the cover nor core tube will separate from the braid and slide thereon while the cover is being held and the coupling is being inserted into the core tube. Also, the core tube must be bonded to the braid with enough adherence thereto so that the core tube will not separate from the braid and stretch lengthwise while the assembly is subject to internal fluid pressure whereby the end of the core tube that is over the coupling barbs will extrude endwise from the braid and cover and permit the coupling to blow off from the hose.

With previously used hoses having core tubes and covers of synthetic rubber with braided Rayon therebetween, the construction has been such that the core tube and cover have been firmly bonded to the reinforcement, and in some cases to each other through the interstices of the braid. In the latter case the braid is somewhat open so that the synthetic rubber may readily penetrate the braid when the core tube and cover are being vulcanized, the usual procedure being to simultaneously vulcanize the core tube and cover after the hose has been formed of unvulcanized materials. With hoses in which the core tube and cover are both synthetic rubber a very good bond is achieved by such vulcanization and separation of the braid from either the core tube or cover has not been a problem.

When substituting PVC for synthetic rubber in either or both the core tube and cover, it has been found that good bonding between the reinforcement and each of the core tube and cover is difficult to obtain. It has also been found that the physical dimensions of hoses using PVC should be somewhat different from hoses made entirely of synthetic rubber when they are to be used with dimensionally identical couplings.

SUMMARY OF THE INVENTION

The present invention provides a hose construction for use with push-on type couplings in which either or both the core tube and cover are made of PVC. The core tube and cover are bonded to a Rayon or Dacron braided reinforcement with predetermined minimum bond strengths. The invention also embraces the joint between the hose and a push-on barb-type coupling, and in this connection it has been found that within limits the joint is made more secure against blowoff of the hose from the coupling by reducing the amount that the hose must be stretched in diameter for mounting it over the barbs, which is contrary to normal expectation.

DETAILED DESCRIPTION

Figure 1:
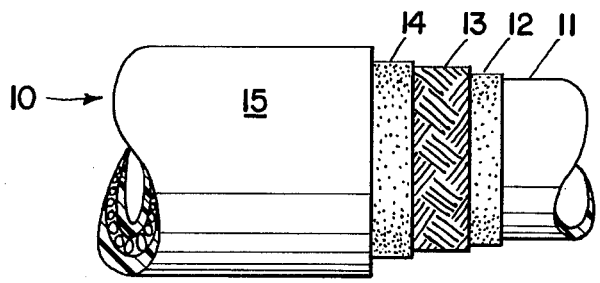
FIG. 1 is a cutaway view of the hose showing the various layers.

As shown in FIG. 1, the hose 10 comprises a core tube 11, a reinforcement 13 of braided yarn, and a cover 15. The reinforcement 13 is bonded to both the core tube and the cover. Core tube 11 may be of either synthetic rubber, such as Buna N or neoprene, or it may be of plasticized PVC such as Alpha No. 640 manufactured by Alpha Corporation and whose chief physical properties are approximately as follows:

Tensile strength - 2400 PSI
Tensile modulus at 100° elongation - 1100 PSI
Elongation at break - 400%
Specific Gravity - 1.39

The synthetic rubber core tube is used when the hose is to be used for conveying oil, gasoline or other fluids for which PVC material is not suitable. The PVC material is used for the core tube when the hose is to be used for conveying air, water or other fluids compatible with PVC. For fluids compatible with both synthetic rubber and PVC, the PVC is preferable because of its lower cost. When either synthetic rubber or PVC is used for the core tube or cover the hardness may be from 60 to 90 Shore A durometer but 80 is preferred.

When the core tube is of either synthetic rubber or PVC, the cover 15 is of PVC, and preferably the particular PVC material described above in connection with the core tube.

If the core tube is of PVC, the cover may likewise be of PVC or it may be of synthetic rubber. Again, the PVC material for the cover is preferred because of its lower cost unless the cover is likely to be contacted by oil or gasoline, in which case the cover is made of synthetic rubber.

When the hose is made with either the core tube or the cover of synthetic rubber and the corresponding cover and core tube are of PVC, suitable materials for the synthetic rubber are a copolymer of acrylonitrile butadienne or polymerized chloroprene compounded to have a hardness of from 60 to 90 Shore A durometer and a compression set of less than 60% when tested to method B, ASTM-D395 for 70 hours at 212°F.

The reinforcement is preferably Rayon because of its relatively low cost and, for example, may be type 120 Avicord made by American Viscose Company. The Rayon should preferably be of 1100 to 1230 denier and twisted to about 2.3 turns per inch. The braid angle should be about 48° to 49° for sizes ¼ inch and ⅜ inch ID and about 54° for ½ inch ID, as compared with a neutral angle of about 54° 44 minutes.

Both the core tube 11 and cover 15 are bonded to the reinforcement 13. The bond should be such that when tested in the manner indicated in FIG. 6, the pounds of force required to separate a 1 inch wide strip of the cover from the braid at the rate of 1 square inch per minute should be about 8 or over. In the same type of test, the pounds of force required to strip the braid from the core tube at the rate of 1 square inch per minute should be about 12 or more.

Figure 6:
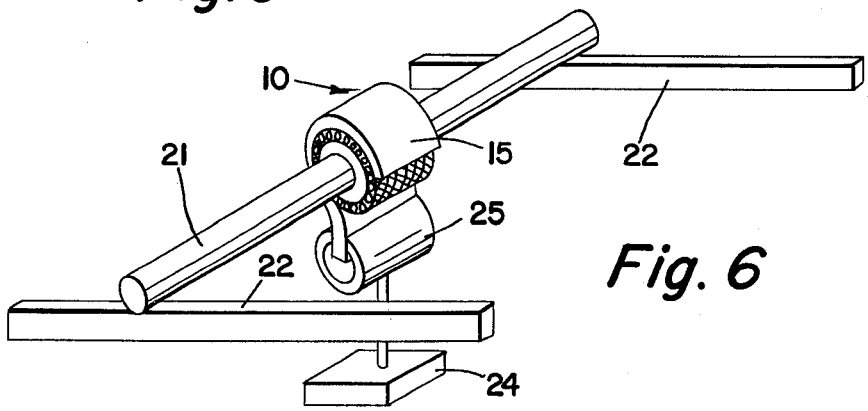
FIG. 6 is a schematic view showing how the adherence of one layer of the hose to another may be tested.

In the adhesion test method illustrated in FIG. 6, a 1 inch long specimen of the hose 10 to be tested is placed upon a close fitting metal mandrel 21 and the latter is supported on a pair of parallel and horizontal bars 22 so as to be free to roll thereon. A lengthwise slit is made in the cover 15 of the specimen and a portion of the cover peeled away from the braid 13 and a weight 24 is attached thereto by means of a suitable clip 25. A weight 24 that will peel the cover 15 from the braid 13 at the designated rate of 1 square inch per minute indicates the pounds of force. This method is in accordance with the "Standard Methods of Test for Adhesion of Vulcanized Rubber (Friction Test)" for the American Society For Testing and Materials published in the Book of ASTM Standards, Part 28 Copyrighted in 1967.

Considerable difficulty has been experienced in obtaining the desired adherence values for the bonding of PVC materials to Rayon. The matter was solved by the following method which is illustrated in FIGS. 3 and 4.

Figure 3:
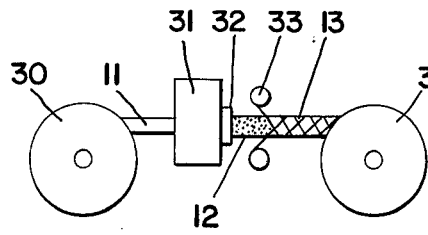
FIGS. 3 and 4 are schematic views illustrating the method of manufacturing the hose.
Figure 4:
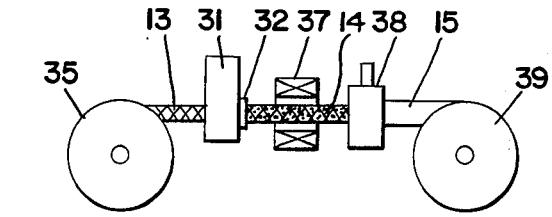

As shown in FIG. 3, core tube 11 from a storage reel 30 is fed through a tank 31 containing an adhesive solution and picks up a coating 12 of the same. As it leaves tank 31, the coated core tube passes through a stripper 32 made of rubber or rubberlike flexible material that strips off excess adhesive so as to leave a coat of about 0.002 inch in thickness upon the core tube. The core tube then passes through a braider 33 that applies braided Rayon yarn to the core tube with the tension of the yarn being about 3 lbs. as it is being applied. The core tube 11 preferably has a rubber or other flexible mandrel therein to keep it from collapsing, according to well known techniques in the industry. The core tube with the braid 13 thus applied is then wound upon another reel 35 and is then stored for several days in a suitable place to permit substantially all of the solvent in the adhesive to evaporate through the interstices of the braid.

Reel 35 is then placed in a position wherein the braid covered core tube is unwound and again passed through tank 31 where it picks up another coating of such adhesive over the braid. As the braid covered tube leaves tank 31 stripper 32 strips off the excess adhesive and leaves a thin film about 0.002 inch thick over the braid 13. The tube is then passed through a heater 37 for driving the solvent out of the adhesive. The tube then goes through a cross head 38 that applies cover 15 and the finished hose is then wound upon a reel 39.

To obtain an adequate bond between the braid and the core tube and cover, the adhesive 12 may be Daubond 8412 made by Daubert Chemical Company. This adhesive is a polyester prepolymer with a polyisocyanate with an ethyl acetate hardener and has a viscosity of 95 to 165 CPS (Brookfield) at 25°C. It contains 30–35% solids by weight in a ketone carrier. It is important to permit evaporation of the solvent from the adhesive coatings applied to the core tube and sheath, either by storing the coated tube for a sufficiently long time or by heating. Otherwise solvent trapped between the core tube and sheath will interfere with proper curing of the adhesive and may cause blisters in the cover. It is recommended that before additional handling the adhesive be allowed to cure for about five days in order to develop the necessary bond strength.

Figure 2:
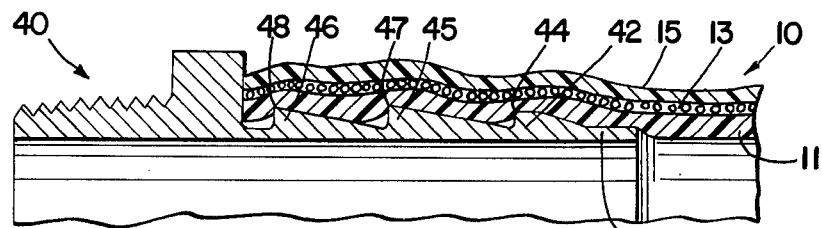
FIG. 2 is a fragmentary cross section view of the hose and a push-on type coupling to which it is assembled.
Figure 5:
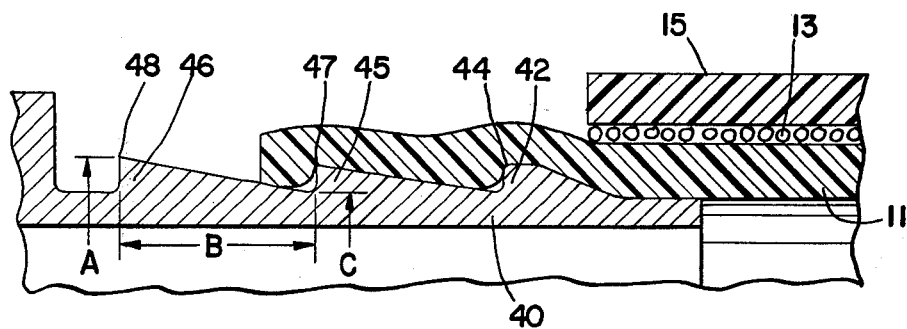
FIG. 5 is a cross section view of a joint in which failure has occurred by pulloff of the hose from the coupling.

The hose is now ready for use in connection with push-on couplings of the type shown in FIGS. 2 and 5. This coupling, generally designated 40, has a nipple portion 41 adapted to be pushed into an end of a section of the hose 10. The nipple has several barbs thereon. The first barb 42 has a rounded rear corner 44. The remaining two barbs 45, 46 have sharp rear corners 47, 48. All of the barbs preferably have the same outside diameter. Dimensions for the barbs on couplings for hoses of given inside diameter are preferably about as follows:

CHART 1 - FITTING DIMENSIONS

| Nominal Hose ID | Number of Barbs | A Barb Large Diameter | B Length of Second and Third Barbs | C Barbs Small Diameter |
|---|---|---|---|---|
| ¼" | 3 | .340 | .250 | .250 |
| ⅜" | 3 | .468 | .335 | .375 |
| ½" | 3 | .598 | .410 | .505 |

The hose of the present invention in which one or both of the core tube and cover are of PVC, should have dimensions approximately as follows:

CHART 2 - PVC HOSE DIMENSIONS

| Nominal Hose ID | Actual ID | Core Tube OD | Cover OD | Braid Angle | Minimum Braid Coverage |
|---|---|---|---|---|---|
| ¼" | .275 | .375 | .525 | 48.7° | 75% |
| ⅜" | .395 | .495 | .645 | 47.7° | 75% |
| ½" | .530 | .630 | .780 | 54° | 75% |

With hoses and couplings dimensioned as described in charts 1 and 2 above the barbs are respectively 124%, 119% and 113% greater in diameter than the actual inside diameter of hoses of nominal ¼ inch, ⅜ inch and ½ inch ID, and with the materials indicated, the force required to push the coupling into the hose into the fully assembled condition as shown in FIG. 2, and with no lubrication on the hose or coupling, will be approximately as follows:

CHART 3 - PUSH-ON FORCE

| Nominal Hose ID | Push-on Force |
|---|---|
| ¼" | 60 lbs. |
| ⅜" | 70 lbs. |
| ½" | 80 lbs. |

These push-on forces can be reduced perhaps up to 10% with a lubricant such as water but generally it is not desirable to use a lubricant if the assembly is to be used before the lubricant can evaporate because there would be a corresponding lowering of the blow off pressure.

Hoses with both PVC core and cover and with Rayon braid constructed and assembled with push-on fittings as indicated above yielded satisfactory results when impulse tested to 325 PSI and 500 PSI in accordance with SAE standard tests and procedures for SAE 100R series hydraulic hose as revised December, 1972, and shown on pages 69 and 70 of SAE Handbook Supplement HS150. The same joints also gave satisfactory results when impulse tested with air to 100 PSI at a temperature of 165°F.

Testing further disclosed that with couplings dimensioned as indicated in chart 1 above, hose with PVC core tubes and covers and Rayon braid, and having inside diameters smaller than listed in chart 2, required higher push-on forces than those indicated in chart 3, as would be expected.

However, testing indicated that such PVC hoses with smaller inside diameters than listed in chart 2 when assembled with couplings having the dimensions listed in chart 1 failed sooner on tests than hoses with the diameters shown in chart 2. This is attributed to the fact that the resulting greater expansion of the hose diameter weakened or partially disrupted the bond. This led to failures wherein with the hose under fluid pressure the core tube became detached from the braid and stretched lengthwise without corresponding stretching of the cover and braid whereby the coupling and core tube pulled away from the braid and cover, as shown in FIG. 5.

When the hose is in position on the coupling, as shown in FIG. 2, all portions of the hose that are expanded over the coupling, that is, the core tube, reinforcement and sheath, are subject to hoop tension that causes contraction of the hose behind barbs 42, 45, 46 to lock the hose to the coupling. When the hose is subjected to axial forces tending to pull the hose off from the coupling, the hose tends to contract in diameter and to lengthen axially. This causes the hose to grip the barbs more tightly. In particular, the braid portion acts in the manner of a Chinese finger for increasing the grip upon the barbs.

Because the braid is bonded to the core tube there is no appreciable axial slippage of the one relative to the other when the hose is under pressure tending to elongate the same and thus there is relatively little movement of the core tube on the edges of the barbs which would otherwise tend to abrade and/or cut the core tube and lead to early failure of the joint. Likewise, bonding of the reinforcement to both the core tube and cover prevents relative axial movement between these parts when the coupling is being inserted into the hose.

We claim:

1. A hose coupling joint comprising a fitting and hose having a bore therethrough, said fitting having an extension with a free end received within said bore, said extension having a circular barb thereon adjacent said free end and within said bore, said barb being tapered rearwardly at an acute angle with the longitudinal axis of said extension so as to have its largest diameter remote from said free end, said barb having a rear face that is substantially normal to said axis, said hose comprising a core tube, a braided tubular reinforcement of fibrous material over the core tube, said braid having an angle less than the neutral angle of the braid prior to insertion of such fitting extension into said hose bore, and a tubular cover over the reinforcement, at least one of said core tube and cover being of polyvinyl chloride plastic with a Shore A hardness between about 60 to 90 durometer, the inside diameter of said core tube being initially between about ¼ inch and ½ inch and said largest diameter of the barb being about 0.068 inch greater than said initial inside diameter of the core tube, whereby the barb diameter is within the range from substantially 124% greater than the initial hose inside diameter when such inside diameter is about ¼ inch to substantially 113% when the hose ID is about ½ inch, and said cover and core tube being bonded to said reinforcement with sufficient adherence whereby the pull required prior to assembly of the hose to the fitting to separate the core tube from the reinforcement is at least 8 lbs. and to separate the cover from the reinforcement is at least 12 lbs. on the test comprising separately peeling a one inch long strip of the cover from the reinforcement and the reinforcement from the core tube at the rate of one inch per minute.

2. The joint of claim 1 in which for hoses of ¼ inch, ⅜ inch and ½ inch nominal inside diameter, the initial braid angles of the braided tubular reinforcement, the actual initial inside diameter of the core tube and said largest diameter of said barb for a corresponding fitting are about as follows:

| Nominal ID of Hose | Actual ID of Core Tube | Largest Diameter of Barb | Braid Angle |
|---|---|---|---|
| ¼" | .275" | .340" | 48° |
| ⅜" | .395" | .468" | 49° |
| ½" | .530" | .598" | 54°. |

3. The joint of claim 2 in which said extension has three barbs thereon of substantially the same diameter and the diameter of said bore with respect to the barb diameters is such that the force required to push the hose over the three barbs is substantially 60 lbs. for a hose of about ¼ inch ID, 70 lbs. for a hose of about ⅜ inch ID, and about 80 lbs. for a hose of about ½ inch diameter and wherein said polyvinyl chloride has a tensile strength of about 2400 PSI and a tensile modulus at 100% elongation of about 1,100 PSI.

4. The joint of claim 1 in which the braid covers about 75% of the outer surface of the core tube.

* * * * *

UNITED STATES PATENT AND TRADEMARK OFFICE
CERTIFICATE OF CORRECTION

PATENT NO. : 3,966,238
DATED : June 29, 1976
INVENTOR(S) : Donald E. Washkewicz, Wayne S. Busdiecker It is certified that error appears in the above-identified patent and that said Letters Patent are hereby corrected as shown below:

On the title page, first column, line 11, the filing date of

Serial No. 465,183 should be April 29, 1974 instead of April 29, 1975.

In column 1, line 5, "1975" should be---1974---.

Signed and Sealed this

*Twenty-fifth* Day of *October 1977*

[SEAL]

*Attest:*

RUTH C. MASON  
*Attesting Officer*

LUTRELLE F. PARKER  
*Acting Commissioner of Patents and Trademarks*